United States Patent [19]

Theobald

[11] Patent Number: 5,027,381
[45] Date of Patent: Jun. 25, 1991

[54] OVER SPEED DATA RATE ADJUSTMENT METHOD AND APPARATUS IN AN ASYNCHRONOUS DATA STREAM

[75] Inventor: Kevin B. Theobald, Cambridge, Mass.

[73] Assignee: Motorola, Inc., Schaumburg, Ill.

[21] Appl. No.: 494,080

[22] Filed: Mar. 15, 1990

[51] Int. Cl.$^5$ ............................................. H04L 25/39
[52] U.S. Cl. ...................................... 375/117; 370/49; 375/118; 375/122
[58] Field of Search .................. 370/48, 49, 108, 109; 375/106, 112, 117, 118, 122

[56] References Cited

U.S. PATENT DOCUMENTS 4,937,839  6/1990  Motley et al. ........................ 375/117

OTHER PUBLICATIONS

CCITT Recommendation, vol. 14, pp. 45-48, Melbourne 1988.

*Primary Examiner*—Benedict V. Safourek
*Attorney, Agent, or Firm*—Charles L. Warren

[57] ABSTRACT

An improved process handles asynchronous data in which certain stop bits have been deleted or extra stop bits added to accommodate speed differences between a data source and the asynchronous data stream rate. A second asynchronous data stream is generated based upon said first data stream. Upon detecting a missing stop bit, a shortened stop bit is generated in the second data stream and a predetermined number of subsequent stop bits are also shortened to achieve synchronization with the first data stream. In a preferred embodiment, the receipt of an extra stop bit in the first data stream while shortened stop bits are being generated results in the extra stop bit not being generated in the second data stream and a corresponding flag set. If another missing stop bit occurs while shortened stop bits are being generated and if the flag is set, a shortened stop bit is inserted and the flag is reset.

12 Claims, 3 Drawing Sheets

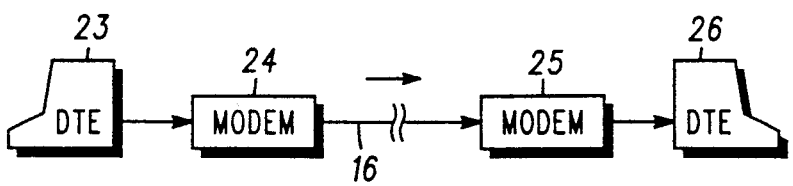
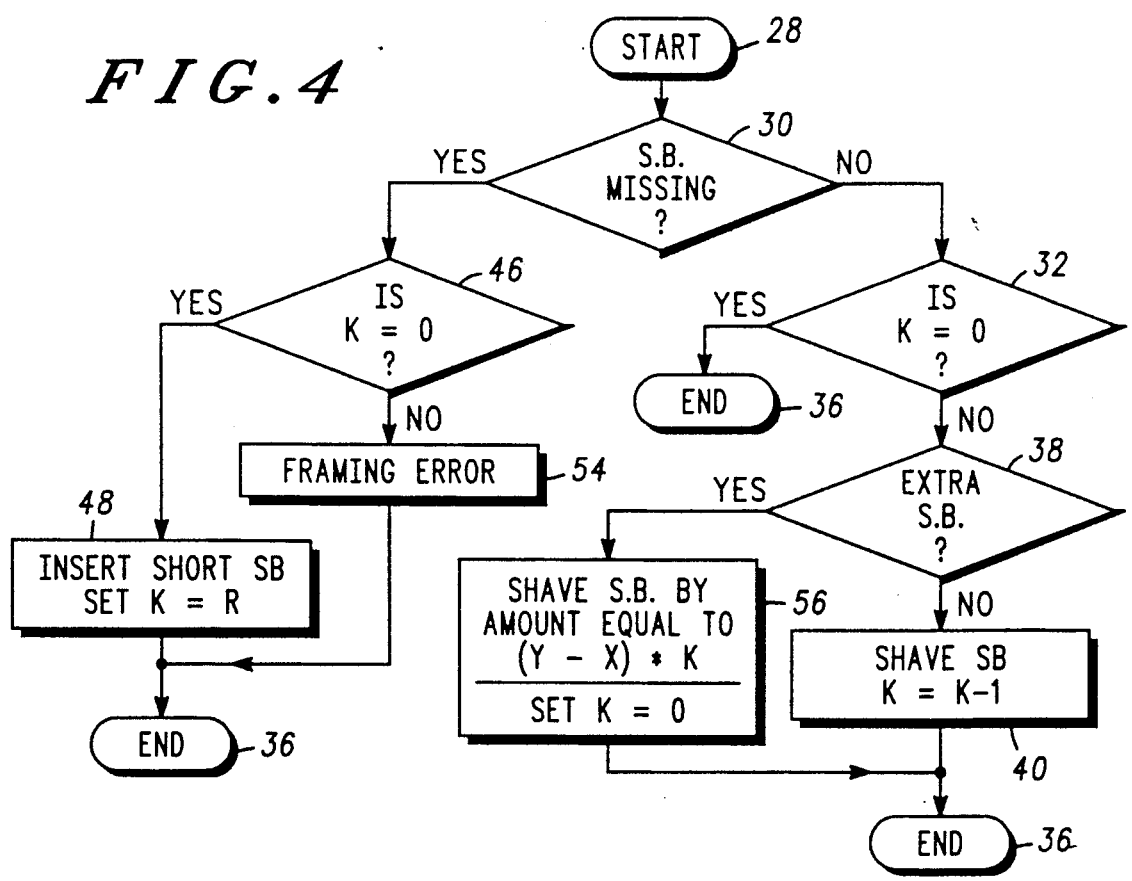

OVER SPEED DATA RATE ADJUSTMENT METHOD AND APPARATUS IN AN ASYNCHRONOUS DATA STREAM

BACKGROUND OF THE INVENTION

This invention addresses a method for adjusting differences in data transmission rates such as between data terminal equipment (DTE) and a modem by stop character manipulation in an asychronous data stream.

When a synchronous DTE sends data to an asynchronous modem at a rate slightly higher than the modem transmission rate, compensation must be provided by the modem or data will be lost. The CCITT V.22 recommendation provides a set of rules which permits certain stop bits to be deleted in order to compensate to a limited overspeed data condition from a DTE.

It is understood by those skilled in the art that asynchronous modem communications utilizes start and stop bits which sandwich character bits being transmitted. The start and stop bits are utilized in the modem transmission network to define the beginning and end of characters. Following the stop bit that indicates the end of a character, there may be additional stop bits before the start bit at the beginning of the next character. As long as both the sending and receiving modem follow compatible rules, it is possible for the sending modem to delete certain information such as stop bits in order to accommodate data being received at a higher rate than can be accommodated by the originating modem.

For example, the CCITT V.22 recommendation allows a stop bit to be omitted by the transmitting modem up to once every 4 (or 8) frames. The receiving modem inserts a shortened stop bit of ¾ (or ⅞) for the stop bit not transmitted and shortens the period of the next 3 (or 7) stop bits ¼ (or ⅛) to regain time synchronization with the received frames.

The CCITT V.14 recommendation provides rules for conveying start-stop characters over synchronous bearer channels using an async-to sync converter. This method is intended to replace the earlier recommendation V.22. While the V.14 recommendation provides certain rules and guidelines, there exists a need for an improved overspeed handling method which is consistent with this recommendation and the note in section 7.2 of the recommendation.

It is an object of the present invention to provide an improved overspeed handling method consistent with the guidelines established by CCITT recommendation V.14.

BRIEF DESCRIPTION OF THE DRAWINGS

FIG. 2 shows a modem communication system in accord with the present invention.

FIG. 4 is a flow diagram illustrating the steps of another embodiment of a method according to the present invention.

DETAILED DESCRIPTION OF THE PREFERRED EMBODIMENTS

Figure 1:
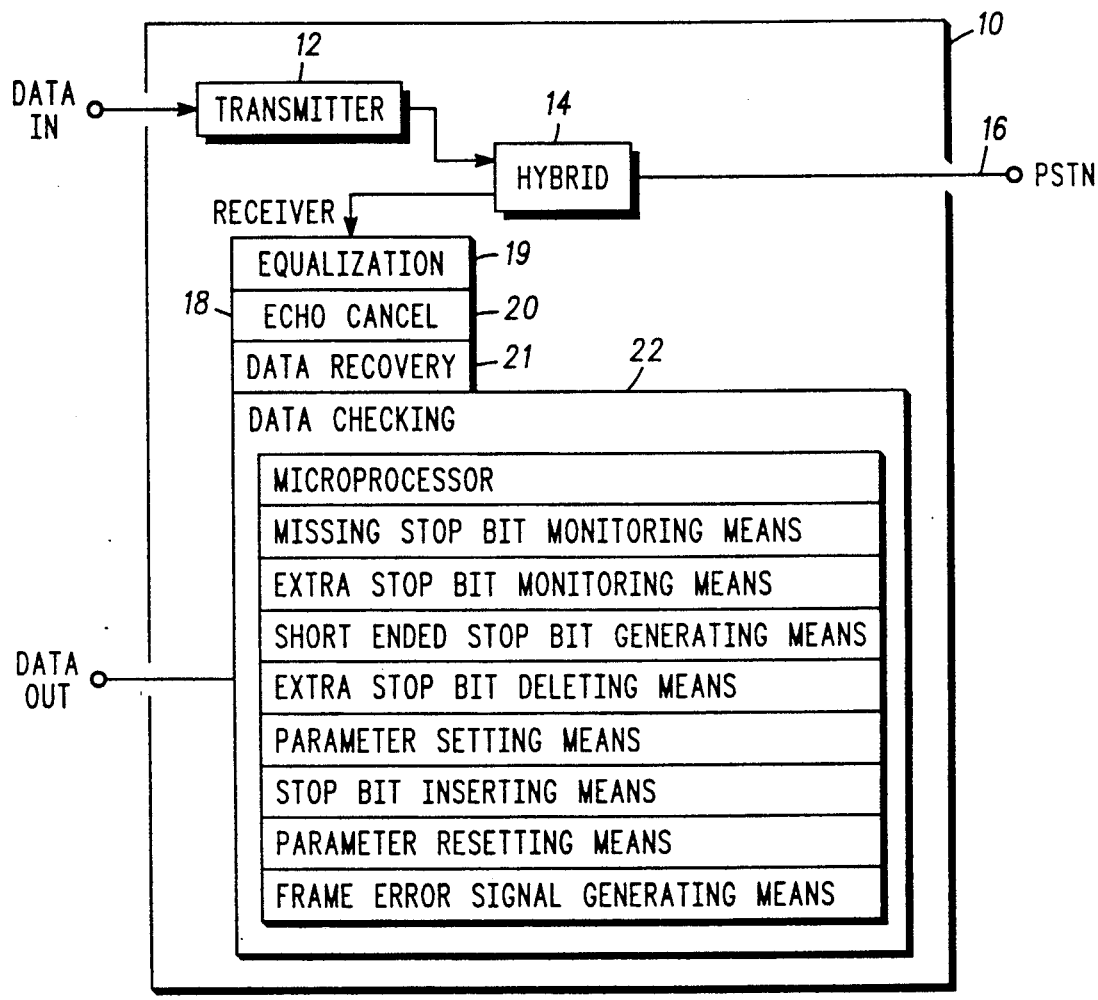
FIG. 1 is a block diagram illustrating a modem which incorporates an embodiment of a method according to the present invention.

FIG. 1 illustrates a modem 10 which incorporates a method according to the present invention. Incoming binary data is received by transmitter 12 which translates the digital information into modulated signals which are coupled to hybrid 14. The output of the hybrid is coupled to a communication channel 16 such as the public switch telephone network (PSTN). Signals transmitted from a remote modem via PSTN 16 are coupled by hybrid 14 to modem receiver 18. The receiver may consist of known implementations using one or more microprocessors and carries out several functions such as equalization 19, echo cancellation 20, data recovery 21 and data checking 22. The output of the receiver consists of data frames in async form derived from the received modulated signals and is typically coupled to a DTE.

The method according to the present invention may be implemented as part of the data checking function 22. This function can be implemented in software or may consist of a hardware state device.

FIG. 2 illustrates a data communication system in which DTE 23 provides a source of data to modem 24 which is connected by the PSTN 16 to modem 25. Modulated signals sent by modem 24 are demodulated by modem 25 which provides data to receiving DTE 26. Of course, DTE 26 can also send data to DTE 23.

Figure 3:
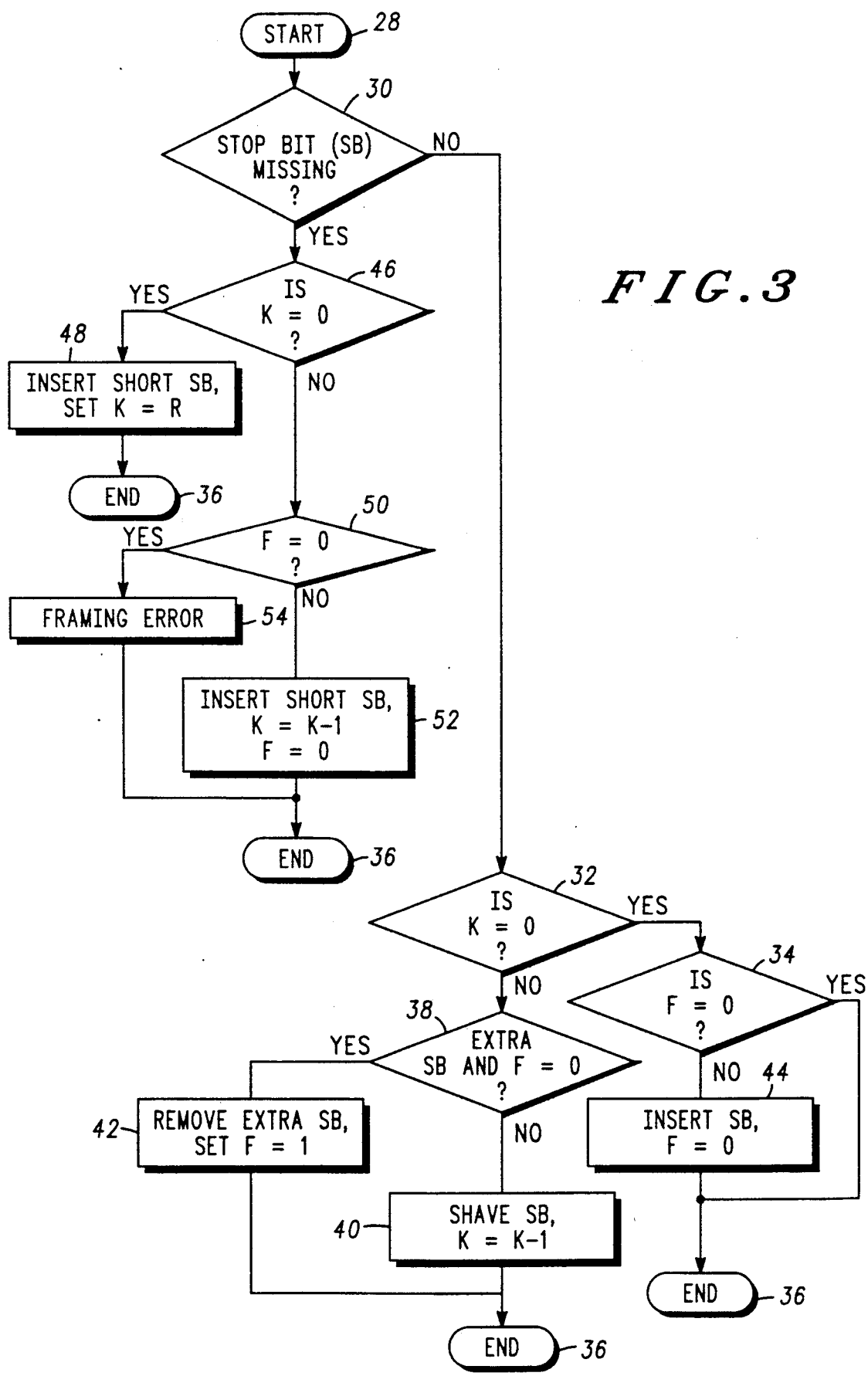
FIG. 3 is a flow diagram illustrating the steps of a preferred method according to this invention.

FIG. 3 illustrates a flow diagram of a preferred method according to the present invention. Symbols used in FIG. 3 are defined as follows. K represents the state of a shave counter. "Shaving" refers to generating a stop bit having a time interval shorter than a normal transmitted stop bit. F represents a flag, where 1=set and 0=reset, that corresponds to an extra stop bit (or idle mark) having been deleted by the receiving modem. As used herein, an extra stop bit also includes an extra idle mark state.

FIG. 3 illustrates a series of steps comprising part of the data checking function by a modem receiver based on the receipt of asynchronous data enclosed by start and stop bits from a remote modem. This method begins by entry at START 28 with an initial decision step 30 in which a determination is made if a stop bit is missing. If NO, then a stop bit has been properly received and decision step 32 determines if the shave counter is inactive, i.e., is K=0? If YES, decision step 34 determines if the stop bit borrow flag F is reset, i.e., is F=0? If YES, then this routine ends at END 36 for the frame being processed. The above path would be followed if appropriate stop bits are received, i.e., the originating modem has not attempted to adjust for an overspeed condition by deleting stop bits and no transmission error have occurred.

If decision step 34 is NO, actions 44 are taken. A whole stop bit is inserted by the receiving modem into the data stream to the DTE and the borrow stop bit flag F is reset, i.e., F=0. This method then ends at 36.

returning to decision step 32, if K≠0 (stop bits to be shaved), a further decision is made by decision step 38. This decision determines whether the stop bit of the current frame constitutes an extra stop bit and if F=0 (borrow flag not set). If NO, the stop bit is shaved by the receiving modem, sent to the DTE, and the shave counter K is decremented, i.e., K=K−1. Following the action this method ends at END 36. If decision step 38 is YES, then the actions at function step 42 are initiated. Thus, the extra stop bit is removed that is it is not sent by the receiving modem to the DTE, and the borrow stop bit flag F is set, i.e., F=1. Following this action this method ends for the current frame.

In the above steps on original decision 30 was required which indicated that a stop bit was not missing, i.e., and appropriate stop bit had been received. Upon review of the possible steps taken it will be apparent that no special action regarding the received stop bit is taken unless the shave counter (K) or the stop bit borrow flag (F) has been set during a preceding frame.

If a stop bit is determined to be missing by decision step 30 (YES), then decision step 46 determines if the stop bit shave counter is inactive, i.e. k=0. If YES, then actions 48 are taken, i.e., a shortened stop bit is inserted into the data stream by the receiving modem, and the shave counter is set, i.e., K=R, where R is an integer greater than 0 such as 3 or 7 for CCITT V.14. The value of R determines the number of successive frames during which a shortened stop bit is to be utilized. Following this action the method ends at 36.

If decision step 46 is NO indicating that the shave counter had been previously set, then determination step 50 determines if the stop bit borrow flag F is reset, F 0. If NO (the flag has been set and not subsequently reset), then the actions at 52 are implemented. A shortened stop bit is inserted, the shave counter is decremented, borrow flag F is reset to 0, and the method ends.

If determining step 50 is YES, then action 54 provides a determination that a framing error has occurred and this method ends at 36. Upon recognizing a framing error, the modem may take conventional action in response to such a determination and require retransmission of one or more frames of data.

As to the amount of overspeed permitted, overspeed values of 1.25% and 2.5% are typically allowed. The smaller percentage is accommodated by the transmitting modem deleting a stop bit up to every eight characters; the greater percentage is accommodated by deleting a stop bit up to every four characters. These values relate to the above value R of shave counter K and the duration of the inserted "shortened" stop bit. For 1.25% overspeed, the inserted shorted stop bit represents ⅞ of a normal stop bit and ⅛ bit time is shaved for the next seven stop bits or extra marks. For 2.5% overspeed the shortened stop bit inserted for the deleted stop bit is ¾ of a normal stop bit and ¼ bit time is shaved from the next three stop bits or extra marks.

FIG. 4 illustrates an alternative embodiments of a method according to the present invention in which elements common with elements of FIG. 3 have like numerals. It will be generally appreciated that this method is similar to the method of FIG. 3 and hence only the differences will be discussed.

The NO decision branch from decision step 46 differs in that a framing error 54 is immediately determined and the method ends as opposed to further decisions and actions associated with the method of FIG. 3. A YES decision by decision step 32 leads to ending the method at END 36. This corresponds to a stop bit having been received and the shave counter not being active.

Upon comparing the steps of FIG. 4 to those of FIG. 3 it will be apparent that the method of FIG. 4 contains no memory regarding a previously received extra stop bit as determined by parameter F. A YES decision by decision step 38 indicates an extra stop bit has been received and the shave counter is active. Upon this determination, the extra stop bit is shaved by (Y−X) times K where Y is the nominal duration of received stop bits, X is the duration of the shortened stop bits being generated in response to a previously missing stop bits, and K is the remaining number of data frames in which shortened stop bits are to be inserted. Thus, the extra stop bit is utilized to "catch-up", i.e. achieve the time synchronization between received data and generated data by accelerating the stop bit shaving process. Following the insertion of the specially shortened stop bit, the shave counter is reset, i.e., K=0. The method then ends.

Although embodiments of the present invention have been described and shown in the drawings, the scope of the invention is defined by the claims which follow.

What is claimed is:

1. A method for generating a second asynchronous data stream based on a received first asynchronous data stream having data frames defined by character data normally sandwiched between a start bit and a stop bit, said first data stream permitting certain stop bits to be deleted and extra stop bits to be transmitted to accommodate speed differences between the rate of data output from a data source and the rate data from said data source is transmitted via said first data stream, the method comprising the steps of:
    a) monitoring said first data stream for a missing stop bit;
    b) upon detecting a missing stop bit in said first data stream, generating stop bits in said second data stream having a shorter duration than corresponding received stop bits for a predetermined number of subsequent data frames;
    c) monitoring said first data stream for an extra stop bit; and
    d) upon detecting an extra stop bit in said first data stream during said predetermined number of frames, deleting said extra stop bit from said second data stream.

2. The method according to claim 1 further comprising the step of setting a parameter to indicate that said extra stop bit has been deleted.

3. The method according to claim 2 further comprising the step of inserting a stop bit in said second data stream upon detecting another missing stop bit in said first data stream during said predetermined number of frames and upon said parameter being set.

4. The method according to claim 3 further comprising the step of resetting said parameter.

5. The method according to claim 2 further comprising the step of determining that a framing error has occurred upon detecting another missing stop bit in said first data stream during said predetermined number of frames and upon said parameter not being set.

6. A modem including means for generating a second asynchronous data stream based on a received first asynchronous data stream having data frames defined by character data normally sandwiched between a start bit and a stop bit, said first data stream permitting certain stop bits to be deleted and extra stop bits to be transmitted to accommodate speed differences between the rate of data output from a data source and the rate data from said data source is transmitted via said first data stream, said modem comprising:
    a) means for monitoring said first data stream for a missing stop bit;
    b) means for generating stop bits in said second data stream having a shorter duration than corresponding received stop bits for a predetermined number of subsequent data frames upon said monitoring means detecting a missing stop bit in said first data stream;

c) means for monitoring said first data stream for an extra stop bit; and d) means for deleting said extra stop bit from said second data stream upon said extra stop bit monitoring means detecting an extra stop bit in said first data stream during said predetermined number of frames.

7. The modem according to claim 6 further comprising means for setting a parameter to indicate said extra stop that has been deleted.

8. The modem according to claim 7 further comprising means for inserting a stop bit in said second data stream upon said stop bit monitoring means detecting another missing stop bit in said first data stream during said predetermined number of frames and said parameter being set.

9. The modem according to claim 8 wherein said means for setting said parameter further includes means for resetting said parameter.

10. The modem according to claim 7 further comprising means for generating a framing error signal upon said stop bit monitoring means detecting another missing stop bit in said first data stream during said predetermined number of frames and upon said parameter not being set.

11. A method for generating a second asynchronous data stream based on a received first asynchronous data stream having data frames defined by character data normally sandwiched between a start bit and a stop bit, and first data stream permitting certain stop bits to be deleted and extra stop bits to be transmitted to accommodate speed differences between the rate of data output from a data source and the rate data from said data source is transmitted via said first data stream, the method comprising the steps of:

a) monitoring said first data stream for a missing stop bit;

b) upon detecting a missing stop bit in said first data stream, generating stop bits in said second data stream having a duration X which is shorter than the duration Y of corresponding received stop bits for a predetermined number of subsequent data frames;

c) monitoring said first data stream for an extra stop bit; and d) generating a special stop bit in said second data stream upon said extra stop bit monitoring means detecting an extra stop bit during said predetermined number of frames, said special stop bit having a duration less than Y by an amount equal to $(Y-X)$ times the remaining number of said predetermined number of subsequent frames.

12. A modem including means for generating a second asynchronous data stream based on a received first asynchronous data stream having data frames defined by character data normally sandwiched between a start bit and a stop bit, said first data stream permitting certain stop bits to be deleted and extra stop bits to be transmitted to accommodate speed differences between the rate of data output from a data source and the rate data from said data source is transmitted via first data stream, the modem comprising:

a) means for monitoring said first data stream for a missing stop bit;

b) means for generating stop bits in said second data stream having a duration X which is shorter than the duration Y of corresponding received stop bits for a predetermined number of subsequent data frames upon said monitoring means detecting a missing stop bit in said first data stream;

c) means for monitoring said first data stream for an extra stop bit; and d) means for generating a special stop bit in said second data stream upon said extra stop bit monitoring means detecting an extra stop bit during said predetermined number of frames, said special stop bit having a duration less than Y by an amount equal to $(Y-X)$ times the remaining number of said predetermined number of subsequent frames.

* * * * *

UNITED STATES PATENT AND TRADEMARK OFFICE
CERTIFICATE OF CORRECTION

PATENT NO. : 5,027,381

DATED : June 25, 1991

INVENTOR(S) : Kevin B. Theobald

It is certified that error appears in the above-identified patent and that said Letters Patent is hereby corrected as shown below:

Column 5, claim 11, line 30, "and" should be --said--.

Column 6, claim 12, line 21, insert --said-- after "via".

On the title page, item [73] Assignee: "Motorola, Inc., Schaumburg, Ill." should be --Codex Corporation, Mansfield, Massachusetts--.

Signed and Sealed this

Eighth Day of December, 1992

Attest:

DOUGLAS B. COMER

Attesting Officer

Acting Commissioner of Patents and Trademarks